United States Patent Office 3,322,815
Patented May 30, 1967

3,322,815
AMINOALKANENITRILES AND PROCESS FOR PREPARING THE SAME
Julian Feldman and Martin Thomas, Cincinnati, Ohio, assignors to National Distillers and Chemical Corporation, New York, N.Y., a corporation of Virginia
No Drawing. Filed July 27, 1964, Ser. No. 385,500
8 Claims. (Cl. 260—465.5)

This invention relates to novel aminoalkanenitriles and to their method of preparation. More particularly, the invention pertains to novel alkyl substituted omega-aminoalkanenitriles as well as to a process for preparing the same.

Heretofore reduction of organic compounds containing two nitrile groups proceeded to the complete reduction of both nitrile groups even when utilizing mild catalysts at room temperature. This chemical phenomenon has consequently prevented the selective hydrogenation of only one of the nitrile groups to produce valuable organic compounds having a wide variety of commercial applications.

One object of the present invention is to provide a novel process for the preparation of alkyl substituted omega-aminoalkanenitriles from alpha-substituted, aliphatic dinitriles.

Another object of the present invention is to provide a novel process for the preparation of 2-methyl-5-aminovaleronitrile from 2-methylene glutaronitrile.

A further object of the present invention is to provide novel alpha-alkyl-omega-aminoalkanenitrile compounds.

A still further object of the present invention is to provide novel 2-alkyl-omega-aminoalkanenitrile compounds and especially 2-methyl-5-aminovaleronitrile.

These and other objects of the invention will become readily apparent from the ensuing description and illustrative embodiments.

In accordance with the present invention it has now been found that the novel alpha-alkyl-omega-aminoalkanenitriles can readily be prepared by selectively hydrogenating alpha-substituted, aliphatic dinitriles at elevated temperatures and pressures in the presence of certain specific catalysts and ammonia or an amine capable of suppressing secondary amine formation under the reaction conditions. In general, the process is carried out by introducing the dinitrile starting material, the ammonia or amine, and the selective catalyst into a conventional reactor, such as an autoclave, and submitting the resulting reaction mixture to elevated hydrogen pressure at elevated temperatures for a period of time sufficient to convert the dinitrile to the omega-aminoalkanenitrile. In order to minimize undesirable polymerization and side reactions, the reaction is preferably carried out in the presence of an inert diluent. In some instances it is also desirable to provide agitation or stirring during the reaction, and this may be accomplished by utilizing conventional equipment. Completion of the reaction is indicated by a cessation of the uptake of hydrogen, and the alpha-alkyl-omega-aminoalkanenitrile product can be isolated or recovered from the resulting reaction product mixture by conventional means such as fractional distillation, extraction, and the like.

The alpha substituted, aliphatic dinitrile employed as the starting material in the process of this invention has the following structural formula:

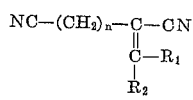

wherein $n$ is an integer from about 1 to 12, preferably about 1 to 6, and $R_1$ and $R_2$ are selected from the group consisting of hydrogen and an aliphatic, straight or branched chain, alkyl group having from 1 to 12 carbon atoms, and preferably from 1 to 6 carbon atoms. $R_1$ and $R_2$ may be the same or different. Examples of specific dinitrile compounds which can be employed as starting material includes 2-methylene glutaronitrile, 2-ethylidene glutaronitrile, 2-ethylidene adiponitrile and 2-propylidene glutaronitrile. The use of 2-methylene glutaronitrile is especially preferred.

The diluent which may be employed in carrying out the process of this invention must exhibit a positive solubility toward the dinitrile and the ammonia or amine. It must also be inert to the reactants and the products. An example of suitable solvents include low molecular weight alkanols having from 1 to 12 carbon atoms per molecule. The use of saturated, aliphatic alcohols having from 1 to 6 carbon atoms per molecule have been found particularly effective for this purpose. Such alcohols include methanol, ethanol, propanol, isopropanol, butanol, hexanol, etc. The actual amount of diluent employed is not critical and may vary over a wide range. In general, the volume ratio of diluent to dinitrile will range from about 1:1 to 2:1, preferably about 1:1.

The use of ammonia as the suppressant for secondary amine formation is preferred. However, it has also been found that tertiary alkyl amines having from about 3 to 18 carbon atoms per molecule will also be effective. Of the tertiary alkyl amines, tertiary aliphatic amines such as triethylamine, trimethylamine, tri-n-butylamine, triisobutylamine, tri-n-propylamine and tri-n-amylamine are preferred. Only a sufficient amount of the ammonia or amine necessary to effectively suppress the formation of secondary amines need be employed. In general, however, the molar ratio of ammonia or amine to the aliphatic dinitrile starting material will range from about 1:1 to 10:1, and preferably from 4:1 to 6:1. It should be understood that higher ratios may also be employed without effecting the rate of conversion to the desired alpha-alkyl-omega-aminoalkanenitrile product.

The particular catalyst employed in carrying out the selective hydrogenation process is an important feature of the present invention. It was found essential to employ a Group VIII hydrogenation catalyst, since other metal catalysts were found to be ineffective or undesirable for the present purposes. The preferred catalysts are selected from the group consisting of nickel, cobalt and ruthenium metal-containing catalysts. Only catalytic amounts of such catalysts need be employed.

In some instances, it is desirable to provide a catalyst on an inert support or carrier such as kieselguhr, carbon, silica, alumina, and the like. It is also possible to enhance the activity of the catalyst by utilizing a metal or metal oxide promoter such as zirconium oxide, etc. It will be understood, however, that neither the use of a support nor the use of a promoter are critical features of the present invention. Especially preferred catalysts are Raney cobalt, zirconium-promoted cobalt on kieselguhr, Raney nickel, nickel on kieselguhr, and ruthenium on carbon. Each of these catalysts is commercially available.

The amount of metal catalyst employed need only be sufficient to obtain catalytic action. In general, however, the amount of metal catalyst employed will range from about 6 to 50%, and preferably about 10 to 40% by weight, based on the total weight of the dinitrile feed material.

Although the temperature at which the selective hydrogenation reaction takes place is not critical, the broad range is from about 50° to 150° C. Preferred reaction temperatures will range from about 80° to 120° C. If lower temperatures are employed, it was found that the rate of reaction is undesirably slow. It will be understood, however, that higher temperatures may be effectively utilized in the event that increased rates of reaction are deemed necessary. The exact pressure employed is also not an essential feature of the present invention, and the pressure need only be sufficiently elevated to maintain the ammonia or amine in the liquid phase at the elevated temperatures used in conducting the reaction. The pressures generally will be at least 75 atms. with a broad range of about 75 to 700 atms. The preferred pressure range is about 85 to 350 atms., although for some purposes and for certain of the above catalysts, such as Raney nickel, it is advantageous to employ pressures below about 200 atms.

The novel compounds produced by practicing the process described above are alpha-alkyl-omega-alkanenitriles having the following structural formula:

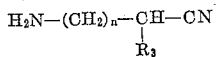

wherein $n$ is an integer from about 1 to 12, preferably about 2 to 6, and $R_3$ is a straight or branched chain alkyl radical having from 1 to 12 carbon atoms, and preferably, 1 to 6 carbon atoms. Specific compounds include, for example, 2-methyl-5-aminovaleronitrile
2-ethyl-7-aminoheptanenitrile
2-ethyl-4-aminobutyronitrile
2-methyl-10-aminodecanenitrile
2-ethyl-6-aminocapronitrile The invention will be more fully understood by reference to the following illustrative embodiments.

*Example I*

(A) 2-methylene glutaronitrile (100 parts), 14 parts of Raney nickel, 115 parts absolute ethanol, and 90 parts anhydrous ammonia were charged to an autoclave and heated to 85° C. under 5200 p.s.i. hydrogen pressure for 16 hours. The product mixture was decanted from the catalyst and fractionally distilled under reduced pressure. A major fraction (59) parts was identified as 2-methyl-5-aminovaleronitrile, B.P. 118–120° C./33 mm.; neutralization equivalent, 111.5; density at 25° C., 0.9173; refractive index at 20° C., 1.4532.

*Analysis.*—Theory: C, 64.3; H, 10.7; N, 25.0. Found: C, 64.2; H, 10.7; N, 24.9%.

(B) Under comparable conditions, but utilizing 2-methyl glutaronitrile as the starting material, no 2-methyl-5-aminovaleronitrile was obtained. The major product was the diamine.

*Example II*

2-methylene glutaronitrile, 25 parts, was hydrogenated in the presence of 14.7 parts Raney nickel, 50 parts absolute ethanol, and 30 parts of anhydrous ammonia at 88° C. and 2250 p.s.i. 10 parts of 2-methyl-5-aminovaleronitrile were produced.

*Example III*

2-methylene glutaronitrile, 201 parts, was hydrogenated in the presence of 69.3 parts of a nickel catalyst obtained by the reduction of a basic nickel salt, 356 parts of absolute ethanol, and 352 parts anhydrous ammonia at a temperature of 100° C. under a pressure of 135 atmospheres. The product contained 74.3 parts of 2-methyl-5-aminovaleronitrile (B.P. 108° C./20 mm.), 13.5 parts 3-methylpiperidine (B.P. 36° C./33 mm.), and 74.8 parts of a viscous, polymeric residue.

*Example IV*

2-methylene glutaronitrile, 24.9 parts, was hydrogenated in the presence of 4.0 parts of ruthenium on carbon catalyst, 59 parts of absolute ethanol, and 10 parts of anhydrous ammonia at a temperature of 100° C. under a pressure of 88 atmospheres. 11.3 parts of 2-methyl-5-aminovaleronitrile and 10.6 parts of a viscous residue were produced.

*Example V*

2-methylene glutaronitrile, 40 parts, was hydrogenated in the presence of 12.5 parts of a zirconium-oxide-promoted cobalt on kieselguhr catalyst, 47 parts of absolute ethanol, and 55 parts anhydrous ammonia at 90° C. and 5000 p.s.i. 20 parts of 2-methyl-5-aminovaleronitrile were recovered.

*Example VI*

2-methylene glutaronitrile, 100 parts, was hydrogenated in the presence of 36 parts of a reduced and stabilized nickel catalyst, 200 parts of absolute ethanol and 101.2 parts of triethylamine at a temperature of 90° C. under a pressure of 136 atmospheres. The product was isolated by vacuum distillation and contained 40 parts of 2-methyl-5-aminovaleronitrile (B.P. 108° C./20 mm.), and 45.6 parts of a slightly viscous polymeric residue.

Comparable results are obtained using tri-n-amylamine in place of triethylamine.

The above data show that the process of this invention can readily be employed to form alpha-alkyl-omega-amino-alkanenitriles. More specifically, the preparation of 2-methyl-5-aminovaleronitrile is demonstrated. This particular compound is a novel and valuable chemical intermediate. This compound can be readily hydrolyzed to 2-methyl-5-aminopentanoic acid by refluxing with 40% sulfuric acid for a sufficient period of time. This is useful for the preparation of polyamides. Also a route to the preparation of the cyclic lactam, 2-oxo-3-methylpiperidene, is provided in accordance with the procedure of Aschan, Ber., 24, 2444–5. This lactom is useful in preparing "methyl nylon-5" and copolymers. The 2-methyl-5-aminovaleronitrile can also be employed as starting material for an important intermediate of anti-malarial drugs.

The following examples will serve to illustrate the hydrolysis of 2-methyl-5-aminovaleronitrile to 2-methyl-5-aminopentanoic acid and the conversion of the former to the lactam, 2-oxo-3-methylpiperidene, respectively.

*Example VII*

2-methyl-5-aminovaleronitrile (11.2 parts) was hydrolyzed over a 3-hour period with 130 parts of 40% sulfuric acid. The resultant mixture was neutralized with 100 parts barium carbonate, filtered, the filtrate concentrated and then treated with lead carbonate followed by hydrogen sulfide, filtration and reconcentration. The crude acid was obtained by precipitation with alcohol. Yield, 4.8 parts (M.P., 180°–200° C.). After recrystallization from alcohol, the acid melted at 183°–183.5° C.

This acid, 2-methyl-5-aminopentanoic acid, can readily be dehydrated to the lactam, 2-oxo-3-methylpiperidine, which in turn can be polymerized to "methyl nylon-5."

*Example VIII*

2-methyl-5-aminovaleronitrile (98 parts) was hydrolyzed by refluxing for three hours with approximately 1040 parts of 40% sulfuric acid. The reaction mixture was neutralized with barium carbonate, 788 parts, while passing hot steam through the mixture. After filtering, the precipitate was washed with cold water and the combined filtrate and washings evaporated to dryness. The residue was heated up to 180° C. while the water being formed was distilled off. After refluxing for one hour and 180°–190° C. the lactam was distilled over at 135°–145° C. under a pressure of 20 mm. Hg. Yield 50 parts (M.P., 55.1°–55.3° C.; B.P., 249°–250° C.; C, 36.33, 63.80%; H, 9.90, 9.91%; N, 12.42, 12.27%. ($C_6H_{11}ON$ requires C, 63.7; H, 9.74; N, 12.4%.)

The alpha-alkyl-omega-aminoalkanenitriles of this invention can also be employed for making cyclic lactams wherein the number of carbon atoms in the ring depends on the number of carbon atoms in the straight chain of the aminoalkanenitrile.

While particular embodiments of this invention are shown above, it will be understood that the invention is obviously subject to variations and modifications without departing from its broader aspects.

What is claimed is:
1. 2-methyl-5-aminovaleronitrile.
2. A process for preparing 2-methyl-5-aminovaleronitrile which comprises reacting 2-methylene glutaronitrile with hydrogen at a temperature between about 50° and 150° C. and a pressure of at least 75 atms. in the presence of liquid phase ammonia or tertiary alkyl amine having from 3 to 18 carbon atoms, the molar ratio of ammonia or tertiary alkyl amine to 2-methylene glutaronitrile ranging from 1:1 to 10:1, a low molecular weight alkanol and nickel, cobalt or ruthenium metal hydrogenation catalyst.
3. The process of claim 2 wherein said alkanol is ethanol.
4. The process of claim 2 wherein said catalyst is Raney cobalt.
5. The process of claim 2 wherein said catalyst is zirconium-promoted cobalt on kieselguhr.
6. The process of claim 2 wherein said catalyst is Raney nickel.
7. The process of claim 2 wherein said catalyst is nickel on kieselguhr.
8. The process of claim 2 wherein said catalyst is ruthenium on carbon.

References Cited
UNITED STATES PATENTS

| | | | |
|---|---|---|---|
| 2,208,598 | 7/1940 | Rigby | 260—465.5 |
| 2,257,814 | 10/1941 | Rigby | 260—465.5 |
| 2,762,835 | 9/1956 | Swerdloff | 260—465.5 |
| 2,830,072 | 4/1958 | Garritsen et al. | 260—465.5 |

CHARLES B. PARKER, *Primary Examiner.*

JOSEPH P. BRUST, *Examiner.*